United States Patent
Harrison

(10) Patent No.: US 9,342,619 B2
(45) Date of Patent: May 17, 2016

(54) RENDERER-ASSISTED WEBPAGE NAVIGATING TOOL

(75) Inventor: Ryan James Harrison, Ontario (CA)

(73) Assignee: GOOGLE INC., Mountain View, CA (US)

( * ) Notice: Subject to any disclaimer, the term of this patent is extended or adjusted under 35 U.S.C. 154(b) by 967 days.

(21) Appl. No.: 13/556,197

(22) Filed: Jul. 24, 2012

(65) Prior Publication Data

US 2015/0199309 A1    Jul. 16, 2015

(51) Int. Cl.
*G06F 17/00* (2006.01)
*G06F 17/30* (2006.01)
*G06F 17/22* (2006.01)

(52) U.S. Cl.
CPC ...... *G06F 17/30905* (2013.01); *G06F 17/2247* (2013.01); *G06F 17/30861* (2013.01)

(58) Field of Classification Search
CPC ............ G06F 17/2235; G06F 17/2247; G06F 3/0482; G06F 3/0485; G06F 3/0489; G06F 17/30861
See application file for complete search history.

(56) References Cited

U.S. PATENT DOCUMENTS

| | | | | |
|---|---|---|---|---|
| 6,785,865 | B1* | 8/2004 | Cote et al. | 715/202 |
| 6,948,132 | B2* | 9/2005 | Bennett et al. | 715/760 |
| 7,552,400 | B1* | 6/2009 | Sriver et al. | 715/827 |
| 8,468,457 | B1* | 6/2013 | Kay et al. | 715/744 |
| 2002/0059181 | A1* | 5/2002 | Kohda et al. | 707/1 |
| 2004/0090463 | A1* | 5/2004 | Celik et al. | 345/767 |
| 2004/0095394 | A1* | 5/2004 | Fox et al. | 345/800 |
| 2004/0100500 | A1* | 5/2004 | Chung et al. | 345/767 |
| 2006/0112346 | A1* | 5/2006 | Miksovsky et al. | 715/764 |
| 2007/0198922 | A1* | 8/2007 | Ludmann | 715/520 |

OTHER PUBLICATIONS

Wolfram MathWorld, Catesian Coordinates, Apr. 7, 2011, Wolfram, pp. 1-3.*

* cited by examiner

*Primary Examiner* — Scott Baderman
*Assistant Examiner* — Howard Cortes
(74) *Attorney, Agent, or Firm* — McDermott Will & Emery LLP

(57) ABSTRACT

Described herein are techniques related to a renderer-assisted webpage navigating tool. This Abstract is submitted with the understanding that it will not be used to interpret or limit the scope and meaning of the claims. A renderer-assisted webpage navigating tool implements keyboard shortcuts that allow a user to navigate within a webpage based on the physical locations and physical relationships of webpage graphical elements relative to each other.

20 Claims, 14 Drawing Sheets

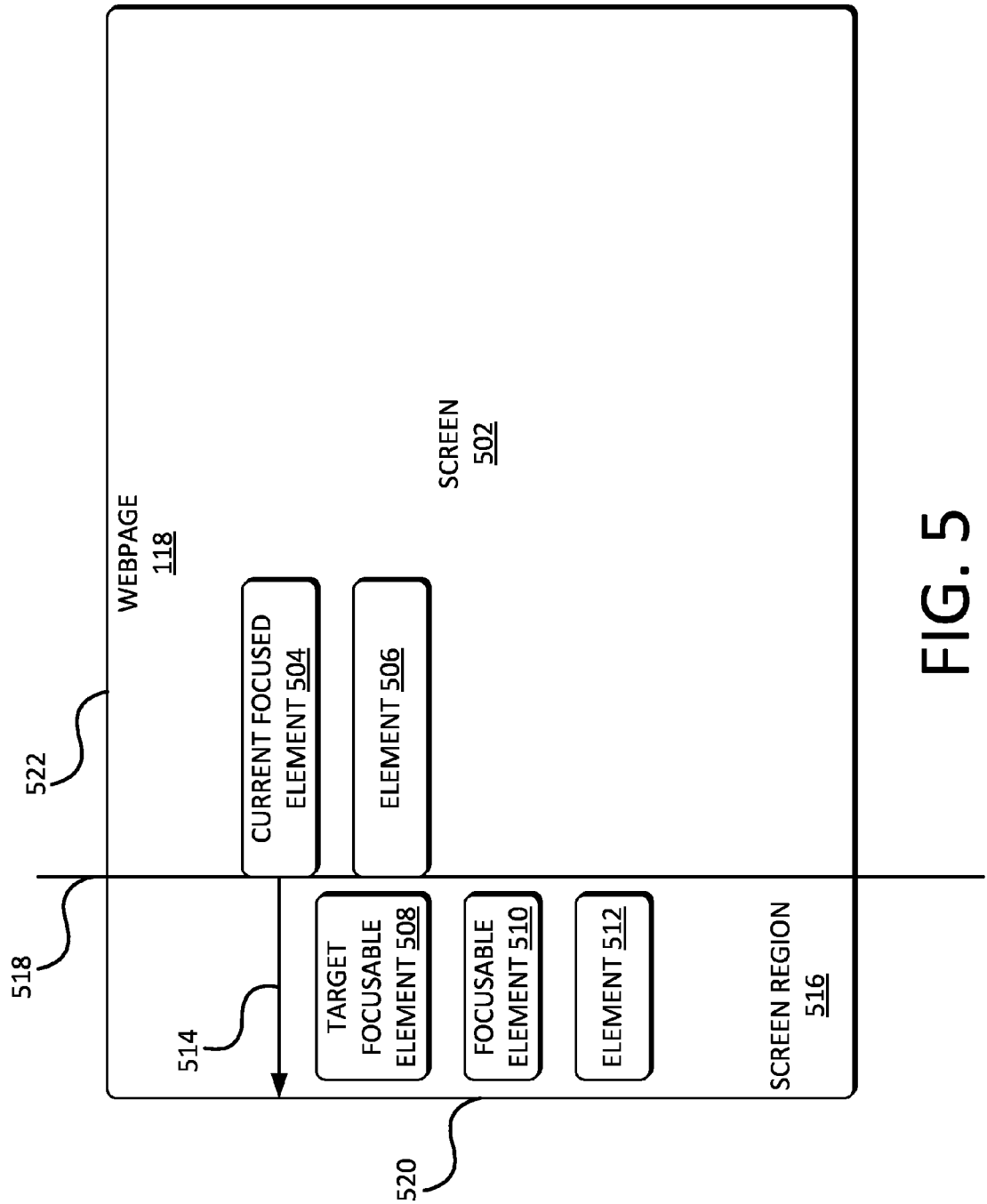

— 118

602

Search | birds | 🔍

About 607,000,000 results (0.13 seconds)

Everything

Images

Maps

Videos

News

More

Seattle, WA
Change Location

Any time
Past hour
Past 24 hours
Past 3 days

Bird – Wikipedia, the free encyclopedia
en.wikipedia.org/wiki/Bird
Birds (class Aves) are feathered, winged, bipedal, endothermic (warm-blooded, egg-lying, vertebrate animals. With Wikipedia, the free encyclopedia
List of birds – Bird anatomy – Bird flight - Birdwatching

Birds, Bird Pictures, Wild Birds – National Geographic
animals.nationalgeographic.com/animals/birds
Learn all you wanted to know about birds with pictures, videos, photos, facts, and news from National Geographic

Your online guide to birds and bird watching
www.allaboutbirds.org/
Use our Bird Guide to identify birds, learn about the life history, listen to the sounds, and watch bird behavior on video – the most comprehensive guide to North....

Bird Photos – /backyard Bird Identifier – Raptor Pictures – Waterfowl Photos

FIG. 6

RENDERER-ASSISTED WEBPAGE NAVIGATING TOOL

BACKGROUND

Typically, if a user wants to navigate to webpage targets (e.g., links, images, text input boxes, etc.) using a keyboard, the user presses the <tab> key to navigate from the current target to the desired target. The order of navigation between targets is specified by the webpage developer.

SUMMARY

In general, one implementation of the subject matter disclosed herein is directed to a webpage navigating tool. The webpage navigating tool includes a renderer. The renderer includes a webpage layout module that is configured to read markup language elements in a webpage. The webpage layout module also is configured to translate the elements into graphical representations and to arrange the graphical representations on a webpage. The graphical representations include a current graphical element displayed on the webpage and a target graphical element displayed on the webpage.

The renderer also includes a spatial-location-relationship determiner that is configured to determine a spatial location of the current graphical element on the webpage and a spatial location of the target graphical element on the webpage. The spatial-location-relationship determiner also is configured to determine a spatial relationship on the webpage between the current and target graphical elements.

The webpage navigating tool includes a user interface that is configured to display the webpage to a user using the graphical representations and to obtain a keyboard shortcut selection from the user that indicates that the user wants to change focus on the webpage from the current graphical element to the target graphical element. The renderer further includes a focus changer that is configured to change the focus on the webpage from the current graphical element to the target graphical element in response to the keyboard shortcut selection and based on the spatial relationship on the webpage between the current and target graphical elements and the spatial location on the webpage of the current and target graphical elements.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 illustrates an example of how the dynamic focus changer illustrated in FIG. 4 operates on the webpage illustrated in FIG. 3 according to one or more implementations described herein.

FIG. 6 through FIG. 10 each illustrates example webpages according to one or more implementations described herein.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
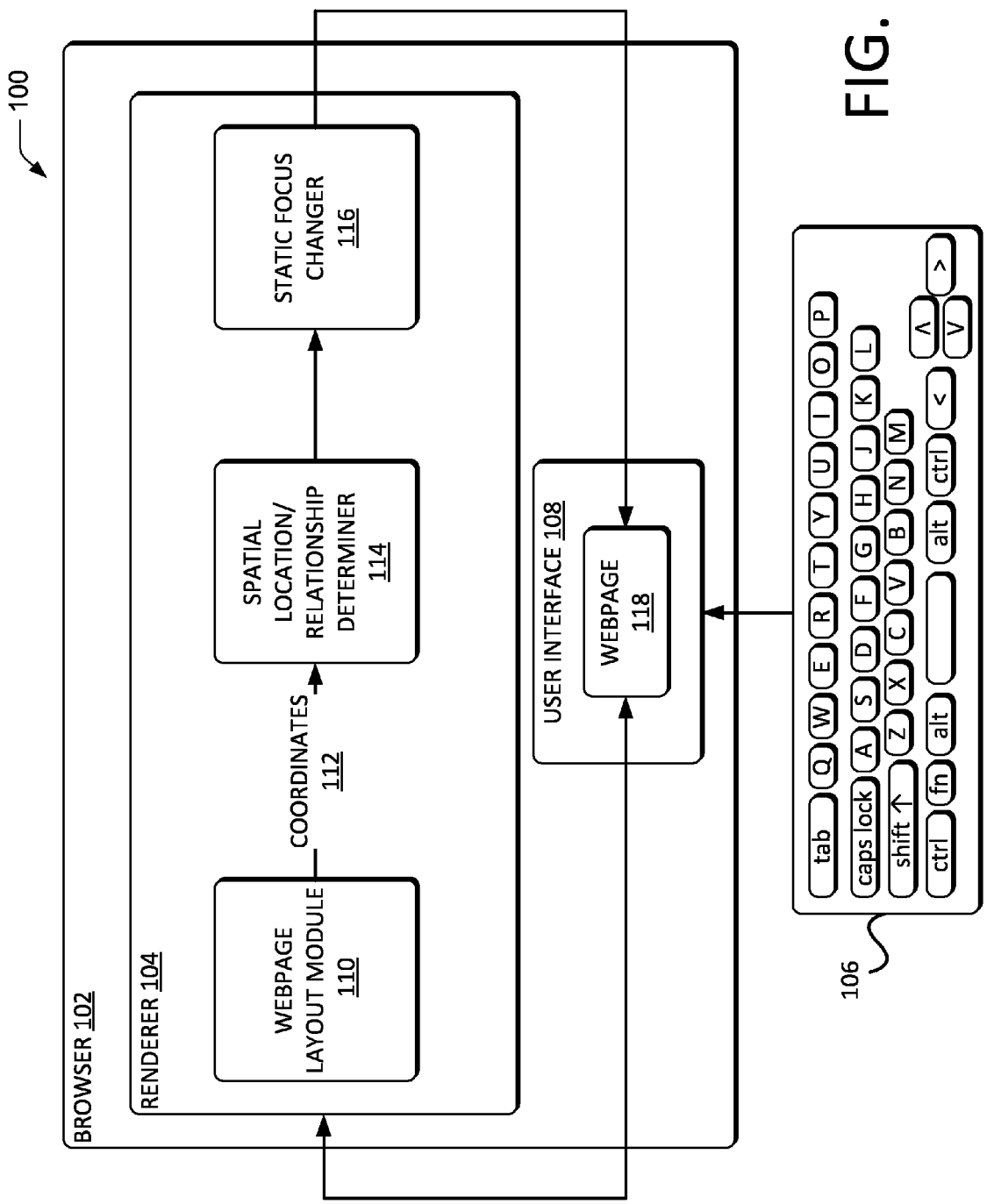
FIG. 1 illustrates an example webpage navigating tool according to one or more implementations described herein.

The technology described herein includes a tool for navigating webpages. A renderer-assisted webpage navigating tool implements keyboard shortcuts that allow a user to navigate within a webpage based on the physical locations of webpage elements and the physical relationships of webpage elements relative to each other.

In one or more implementations described herein, the webpage navigating tool is implemented in a browser, which is used to display a webpage to a user. The webpage navigating tool includes a renderer and a user interface. The webpage navigating tool also includes a user input device (e.g., a keyboard), which is used to enter keyboard selections into the user interface so the user can navigate within the webpage.

In one or more implementations described herein, the renderer reads hypertext markup language (HTML) that is on a webpage and translates the HTML into graphical representations of webpage elements. The renderer determines a spatial location of the elements on the webpage as well as spatial relationships between the elements.

The user interface displays the webpage to the user and receives a keyboard shortcut selection that indicates that the user wants to change focus on the webpage from a current element to a new target element. In response to the keyboard shortcut selection, and based on the spatial location of the elements and the spatial relationship between the elements, the renderer changes the focus on the webpage from the currently focused element to the target element.

In one or more implementations described herein, the focus changes from the current element to the target element without traversing the space in between the two elements. This means that an element that located to the left of and close to the target element and an element located to the right of and far from the target element can be reached in the same number of keystrokes. Moreover, the order in which the elements are traversed is not necessarily pre-defined.

For example, if the user wants to move the focus on the webpage from the current element towards the top of the webpage, with one or more implementations described herein the user enters a keyboard shortcut selection of "<ctrl> <shift>^," where "^" represents the up arrow on the keyboard. In response to receiving the keyboard shortcut selection, the renderer moves the focus on the webpage towards the top of the webpage.

Similarly, if the user wants to move the focus on the webpage from the current target towards the bottom of the webpage, in one or more implementations, the user enters a keyboard shortcut selection of "<ctrl> <shift> v," where "v" represents the down arrow on the keyboard. In response to receiving the keyboard shortcut selection, the renderer moves the focus on the webpage towards the bottom of the webpage.

If the user wants to move the focus on the webpage from the current target towards the right of the webpage, in one or more implementations the user enters a keyboard shortcut selection of "<ctrl> <shift> >," where ">" represents the right arrow on the keyboard. In response to receiving the keyboard shortcut selection, the renderer moves the focus on the webpage towards the right of the webpage.

If the user wants to move the focus on the webpage from the current target towards the left of the webpage, in one or more implementations the user enters a keyboard shortcut selection of "<ctrl> <shift> <," where "<" represents the left arrow on the keyboard. In response to receiving the keyboard shortcut selection, the renderer moves the focus on the webpage towards the left of the webpage.

Example Webpage Navigating Tool Using a Static Focus Changer

FIG. 1 illustrates an example webpage navigating tool 100 according to one or more implementations described herein in which focus on a webpage is changed using a static focus changer. The illustrated webpage navigating tool 100 is implemented in a browser 102, which includes a renderer 104 and a user interface 108. The illustrated webpage navigating tool 100 also uses a keyboard 106 to obtain user selections for input into the user interface 108.

The illustrated renderer 104 includes a webpage layout module 110, which outputs coordinates 112. The renderer 104 also includes a spatial location/relationship determiner 114, and a static focus changer 116. The illustrated user interface 108 includes a webpage 118.

In one or more implementations, the browser 102 is a multi-process web browser that handles the user interface 108 and manages other processes that run on top of the browser 102, such as one or more renderer processes (implemented by the renderer 104), plugin processes, extension processes, and the like. Although the webpage navigating tool 100 is illustrated as being implemented in the browser 102, implementations are not limited to browser applications. For example, the webpage navigating tool 100 may be implemented in applications in which markup languages and/or other languages are interpreted to perform graphical layout. One such application includes a hypertext markup language HTML integrated development environment (IDE). Alternative applications include those in which WebKit Developer Tools and/or a multi-process application, such as Chromium, have been embedded In one or more implementations, the renderer 104 reads scripts, Cascade Style Sheets, etc., to render images, text, fonts, and so forth, on the webpage 118.

The illustrated keyboard 106 includes a portion of a standard QWERTY keyboard. For example, the keyboard 106 includes keys such as <tab>, <ctrl>, <alt>, ˆ (or up arrow), v (or down arrow), < (or left arrow), and > (or right arrow). In one or more implementations, the keyboard 106 obtains one or more keyboard shortcuts from a user, which indicates that the user wants to change focus from a current element to a target element. The keyboard shortcuts are passed to the user interface 108.

With one or more implementations described herein, the user interface 108 displays the webpage 118 to a user using the graphical representations of the HTML elements. The user interface 108 also obtains one or more user keyboard shortcut selections from a user. The keyboard shortcut selections indicate that the user wants to change focus on the webpage 118 from the current element to a new target element.

In one or more implementations, the webpage layout module 110 reads markup language elements, such as hypertext markup language (HTML) elements. The webpage layout module 110 also translates the HTML elements into graphical representations of the HTML elements so that images, text, fonts, etc., are displayed on the webpage 118.

In one or more implementations, the webpage layout module 110 obtains screen coordinates 112 from the markup language. The screen coordinates 112 include where the elements are located on the webpage 118 screen. The coordinates 112 may utilize any arbitrary coordinate system that is mappable to a two-dimensional space is suitable. For example, any rectilinear coordinate system, Cartesian coordinate system, polar coordinate system, or the like is suitable. Using a polar coordinate system one set of keyboard shortcuts controls the distance from the center of the webpage 118 screen to a target element and another set of keyboard shortcuts controls the rotation around the screen from one element to another.

The webpage layout module 110 provides the coordinates 112 to the spatial location/relationship determiner 114. In one or more implementations, the spatial location/relationship determiner 114 determines the spatial location of the elements on the webpage 118. That is, the spatial location determiner 114 determines where the elements are on the webpage 118. The spatial location/relationship determiner 114 uses screen coordinates 112 to determine where the elements are located.

In one or more implementations, the spatial location/relationship determiner 114 also determines the spatial relationship among the graphical representations of the HTML elements on the webpage 118. That is, the spatial location/relationship determiner 114 determines how the elements relate to each other on the webpage 118. The spatial location/relationship determiner 114 uses the coordinates 112 to determine how the elements relate to each other on the webpage 118.

In one or more implementations, the spatial location/relationship determiner 114 accesses information from the webpage layout module 110 as a tuple of [graphical element, coordinate]. Once the information from the webpage 110 is read into the webpage layout module 110, the webpage layout module 110 generates a list of tuples for each motion. For example, the webpage layout module 110 generates the following tuples: [graphical element, left_element, right_element, down_element, up_element].

With one or more implementations described herein, the static focus changer 116 changes focus on the webpage 118 from one element to another element in response to a keyboard shortcut selection by a user. For example, the static focus changer 116 changes focus by obtaining a previously-stored data structure that has been augmented with data indicating the spatial location of and spatial relationship between the currently focused element and the target element. The static focus changer 116 generates the previously-stored data structure.

Example Static Focus Changer

Figure 2:
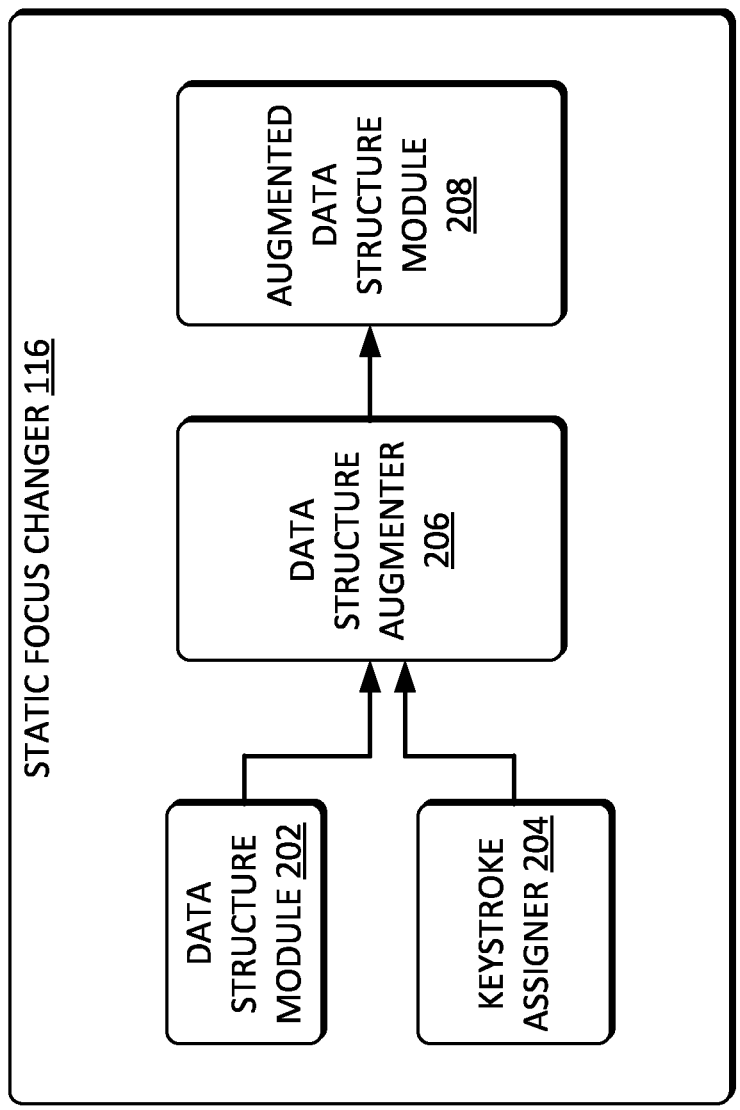
FIG. 2 illustrates an example static focus changer according to one or more alternative implementations described herein.

FIG. 2 illustrates an example of the static focus changer 116 according to one or more alternative implementations described herein. In one or more implementations, the static focus changer 116 uses a data structure of the webpage 118 that have been augmented to include assigned keyboard shortcuts. The augmented data structure is stored and the status focus changer 116 uses the stored augmented data structure to change focus on the webpage 118 in accordance with the keyboard shortcuts.

The illustrated static focus changer 116 includes a data structure module 202, a keyboard shortcut assigner 204, a data structure augmenter 206, and an augmented data structure module 208.

In one or more implementations, the data structure module 202 builds a data structure that stores data about the layout of the webpage 118. For example, the data structure module 202 builds a data structure that stores data about where images, text boxes, buttons, etc., are located on the screen. For some implementations, the data structure module 202 parses the incoming HTML elements and translates them into the data structure for the webpage 118. The data structure is a representation of a webpage as a data structure (e.g., a tree structure) that can be easily navigated and modified, and includes data about where images, text boxes, buttons, etc., are located on the webpage 118.

In one or more implementations, the keyboard shortcut assigner 204 assigns user keyboard shortcuts to webpage 118 screen positions. For example, the keyboard shortcut assigner 204 assigns user keyboard shortcuts to positions such as left, right, up, and/or down.

In one or more implementations, a keyboard shortcut selection of "<ctrl> <shift> ^," where "^" represents the up arrow on the keyboard is assigned to the action of moving the focus on the webpage 118 towards the top of the webpage 118. Similarly, a keyboard shortcut selection of "<ctrl> <shift> v," where "v" represents the down arrow on the keyboard 106 is assigned to the action of moving the focus on the webpage 118 towards the bottom of the webpage 118.

In one or more implementations, a keyboard shortcut selection of "<ctrl> <shift> >," where ">" represents the right arrow on the keyboard is assigned to the action of moving the focus on the webpage 118 towards the right of the webpage 118. Similarly, a keyboard shortcut selection of "<ctrl> <shift> <," where "<" represents the left arrow on the keyboard 106 is assigned to the action of moving the focus on the webpage 118 towards the right of the webpage 118. Of course, these are only example keyboard shortcuts and are meant to be illustrative.

In one or more implementations, the data structure augmenter 206 augments the original data structure created by the data structure module 202. For example, the data structure augmenter 204 obtains the original data structure and the assigned user keyboard shortcuts and augments the data structure built by the data structure module 202 with data representing the keyboard shortcuts. With some implementations, the data structure is modified using WebKit Developer Tools, F12 Developer Tools by Microsoft®, Firebug Developer Tools by Mozilla®, and similar webpage developer tools that facilitate editing data structures.

In implementations in which a keyboard shortcut is assigned to the action of moving the focus on the webpage 118 towards the top of the webpage 118, the data structure augmenter 206 augments the data structure to include one or more "element.MoveUpCallBack=up_element.focus( )" elements/nodes instructing the focus on the webpage 118 to move towards the top of the webpage 118. When the keyboard shortcut that is assigned to the up action is selected "element.MoveUpCallBack( )" is called using a method call, in WebKit, for example, and the focus on the webpage 118 moves towards the top of the webpage 118.

Alternatively, elements/nodes of the data structure are encoded with "up_element.focus( )" directly. In this example, when the keyboard shortcut that is assigned to the up action is selected the focus on the webpage 118 moves towards the top of the webpage 118.

In implementations in which a keyboard shortcut selection is assigned to the action of moving the focus on the webpage 118 towards the bottom of the webpage 118, the data structure augmenter 206 augments the data structure accordingly. For example, the data structure augmenter 206 adds one or more "element.MoveDownCallBack=down_element.focus( )" elements/nodes to the data structure that include instructions to move the focus on the webpage 118 towards the bottom of the webpage 118. When the keyboard shortcut that is assigned to the down action is selected "element.MoveDownCallBack( )" is called using a method call, and the focus on the webpage 118 moves towards the bottom of the webpage 118.

Alternatively, elements/nodes of the data structure is encoded as with "down_element.focus( )" directly. In this example, when the keyboard shortcut that is assigned to the down action is selected the focus on the webpage 118 moves towards the bottom of the webpage 118.

In implementations in which a keyboard shortcut selection is assigned to the action of moving the focus on the webpage 118 towards the left of the webpage 118, the data structure augmenter 206 augments the data structure accordingly. For example, the data structure augmenter 206 adds one or more "element.MoveLeftCallBack=left_element.focus( )" elements/nodes to the data structure that include instructions to move the focus on the webpage 118 towards the left of the webpage 118. When the keyboard shortcut that is assigned to the left action is selected "element.MoveLeftCallBack( )" is called using a method call, and the focus on the webpage 118 moves towards the left of the webpage 118.

Alternatively, elements/nodes of the data structure is encoded as with "left_element.focus( )" directly. In this example, when the keyboard shortcut that is assigned to the left action is selected the focus on the webpage 118 moves towards the left of the webpage 118.]

In implementations in which a keyboard shortcut selection is assigned to the action of moving the focus on the webpage 118 towards the right of the webpage 118, the data structure augmenter 206 augments the data structure accordingly. For example, the data structure augmenter 206 adds one or more "element.MoveRightCallBack=right_element.focus ( )" elements/nodes to the data structure that include instructions to move the focus on the webpage 118 towards the right of the webpage 118. When the keyboard shortcut that is assigned to the right action is selected "element.MoveRightCallBack( )" is called using a method call, and the focus on the webpage 118 moves towards the right of the webpage 118.

Alternatively, elements/nodes of the data structure is encoded as with "right_element.focus( )" directly. In this example, when the keyboard shortcut that is assigned to the right action is selected the focus on the webpage 118 moves towards the right of the webpage 118.

In one or more implementations, the augmented data structure module 208 stores the data structure augmented by the data structure augmenter 206. In response to an entry of a keyboard shortcut, the static focus changer 116 obtains and interprets the augmented data structure from the augmented data structure module 208, and changes the focus on the webpage 118 to the element that the "element.focus ( )" element/node includes.

For example, in response to a keyboard shortcut selection indicating that the user wants to move the focus the up towards the top of the webpage 118 the static focus changer 116 obtains the augmented data structure from the augmented data structure module 208, interprets the augmented data structure, and moves focus on the webpage 118 towards the top of the webpage 118 using the data in the augmented data structure.

Similarly, in response to a keyboard shortcut selection indicating that the user wants to move the focus the down towards the bottom of the webpage 118 the static focus changer 116 obtains the augmented data structure from the augmented data structure module 208, interprets the augmented data structure, and moves focus on the webpage 118 towards the bottom of the webpage 118 using the data in the augmented data structure.

Although the data structures described herein include hyperlinks and/or other forms of browser-executable codes, the hyperlinks and/or other forms of browser-executable codes are not intended to be active links.

Example Webpage Navigating Tool Using a Dynamic Focus Changer

Figure 3:
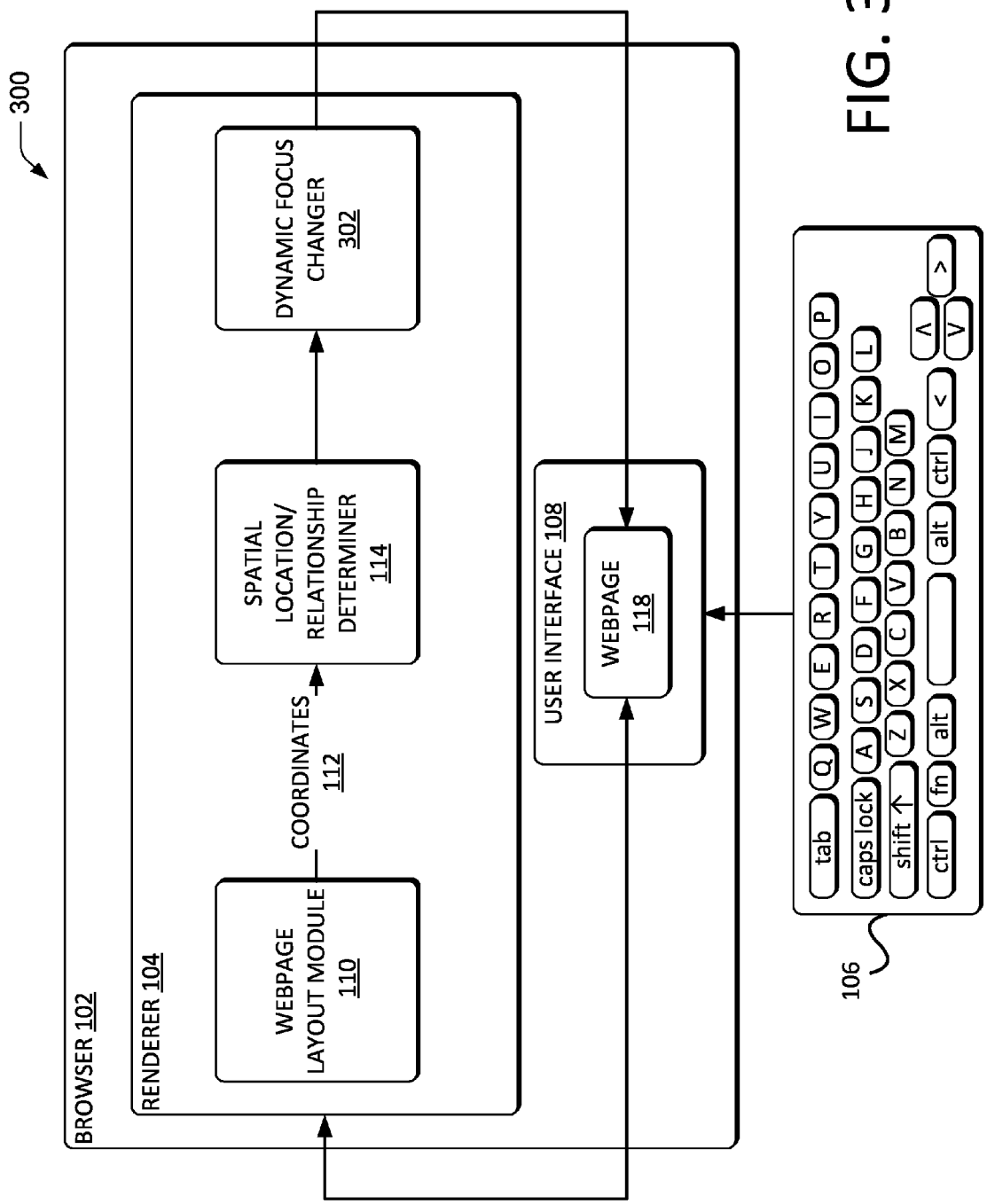
FIG. 3 illustrates an example webpage navigating tool according to one or more alternative implementations described herein.

FIG. 3 illustrates an example webpage navigating tool 300 according to one or more alternative implementations described herein in which focus on a webpage is changed using a dynamic focus changer 302. The illustrated webpage navigating tool 300 also is implemented in the browser 102, which includes the renderer 104 and the user interface 108. The illustrated webpage navigating tool 300 uses the keyboard 106 to obtain user selections for input into the user interface 108.

The illustrated renderer 104 includes the webpage layout module 110, which outputs the coordinates 112. The renderer 104 also includes the spatial location/relationship determiner 114, and the dynamic focus changer 302. The illustrated user interface 108 includes the webpage 118.

In one or more implementations, the dynamic focus changer 302 changes focus on the webpage 118 by selecting a group of focusable elements and iterating through the selected group in real time until the target element is reached.

As is the case with the webpage navigating tool 100, although the webpage-navigating tool 300 is illustrated as being implemented in the browser 102, implementations are not limited to browser applications. For example, the webpage navigating tool 300 may be implemented in applications in which markup languages and/or other languages are interpreted to perform graphical layout.

Example Dynamic Focus Changer

Figure 4:
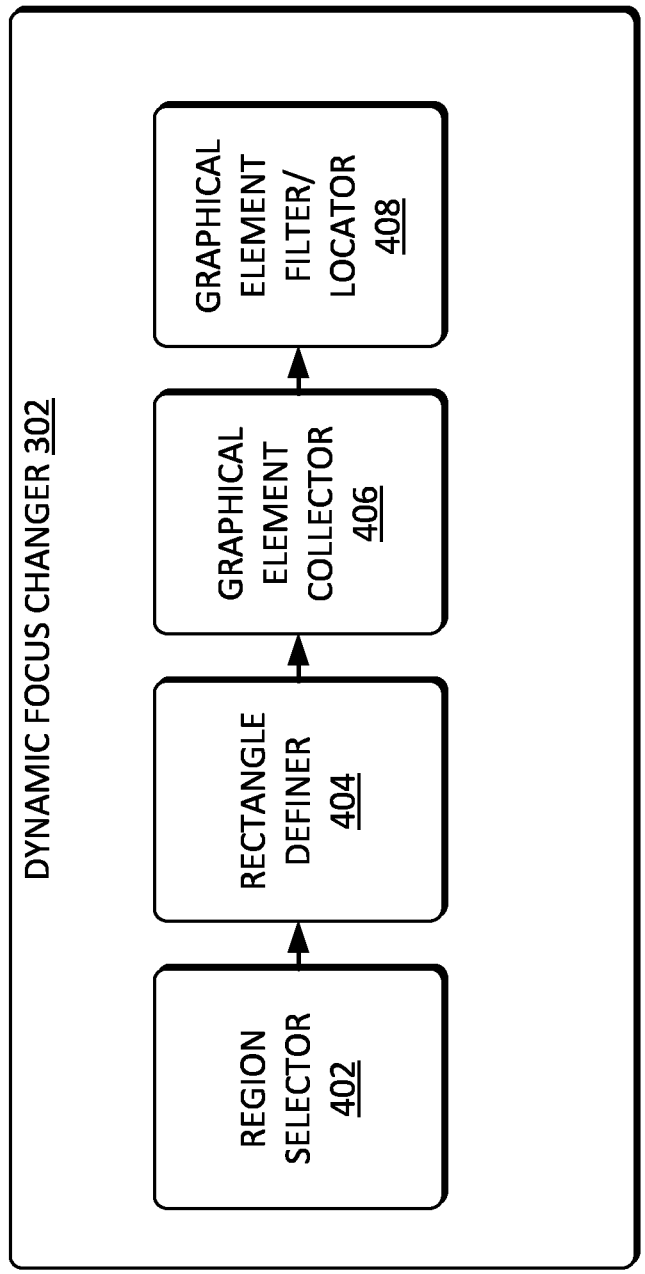
FIG. 4 illustrates an example dynamic focus changer according to one or more alternative implementations described herein.

FIG. 4 illustrates the dynamic focus changer 302 according to one or more implementations described herein. FIG. 5 illustrates an example of how the dynamic focus changer 302 operates on the webpage 118 according to one or more implementations described herein. In one or more implementations, in response to obtaining a keyboard shortcut selection from a user indicating that the user wants to change focus from a current element to a new target element the dynamic focus changer 302 specifies a screen region on the webpage 118 and obtains a filtered list of elements in the screen region of the webpage 118. The filtered list may include only elements that are focusable. The dynamic focus changer 302 then iterates through the filtered list to find the target focusable element and changes focus on the webpage 118 to the target focusable element.

The dynamic focus changer 302 illustrated in FIG. 4 includes a region selector 402, a rectangle definer 404, a graphical element collector 406, and a graphical element filter 408. With one or more implementations described herein, in response to obtaining an assigned keyboard shortcut selection from a user the dynamic focus changer 302 changes focus on the webpage 118 from one focusable element to a target focusable element.

The webpage 118 illustrated in FIG. 5 includes a screen 502, a current focused element 504, an element 506, a target focusable element 508, a focusable element 510, an element 512, a direction arrow 514, screen region 516, and a line 518 (perpendicular line 518) that is perpendicular to the direction arrow 514. The illustrated screen region 516 includes an edge 520 and an edge 522.

For purposes of explanation, assume that a user wants to change focus from the current focused element 504 to the target focusable element 508. The direction that the focus on the screen 502 is to move is indicated by the direction arrow 514.

With one or more implementations described herein, the region selector 402 selects the screen region 516, which includes the target focusable element 508. The region selector 402 selects the screen region 516 using a method call, in the WebKit library, for example.

The rectangle definer 404 uses the spatial location of the current focused element 504 and the direction of focus motion 414 to define a rectangle. In the illustrated implementations, the rectangle is defined by the perpendicular line 518, the left edge 520, and the top edge 522. The method call uses the coordinates of the corners of the rectangle created by the perpendicular line 518, the left edge 520, and the top edge 522 to define the rectangle in the screen region 516. The screen region 516 is where the target focusable element 508 is located.

In one or more implementations, the graphical element collector 406 obtains a list of focusable and non-focusable elements that are located in the screen region 516. In the illustrated implementation, the element 506, the target focusable element 508, the focusable element 510, and the element 512 are in the rectangle.

In one or more implementations, the graphical element filter 408 obtains a list of focusable elements in the rectangle defined by the perpendicular line 518, the left edge 520, and the top edge 522. In keeping with the example, the graphical element filter 308 obtains a list that includes the target focusable element 508 and the focusable element 510, but which does not include the element 512 because the element 512 is not focusable. The list also does not include the current focused element 504 or element 506 because they are not inside the rectangle defined by the perpendicular line 518, the left edge 520, and the top edge 522. The graphical element filter 408 then iterates through the filtered list of elements to arrive at the target focusable element 508.

Example Webpages

FIG. 6 illustrates an example of the webpage 118 according to one or more implementations described herein. The illustrated webpage 118 shows a search result for the search term "birds" being entered in a search text box 602. Also, the focus on the webpage 118 is on the search text box 602.

Figure 7:
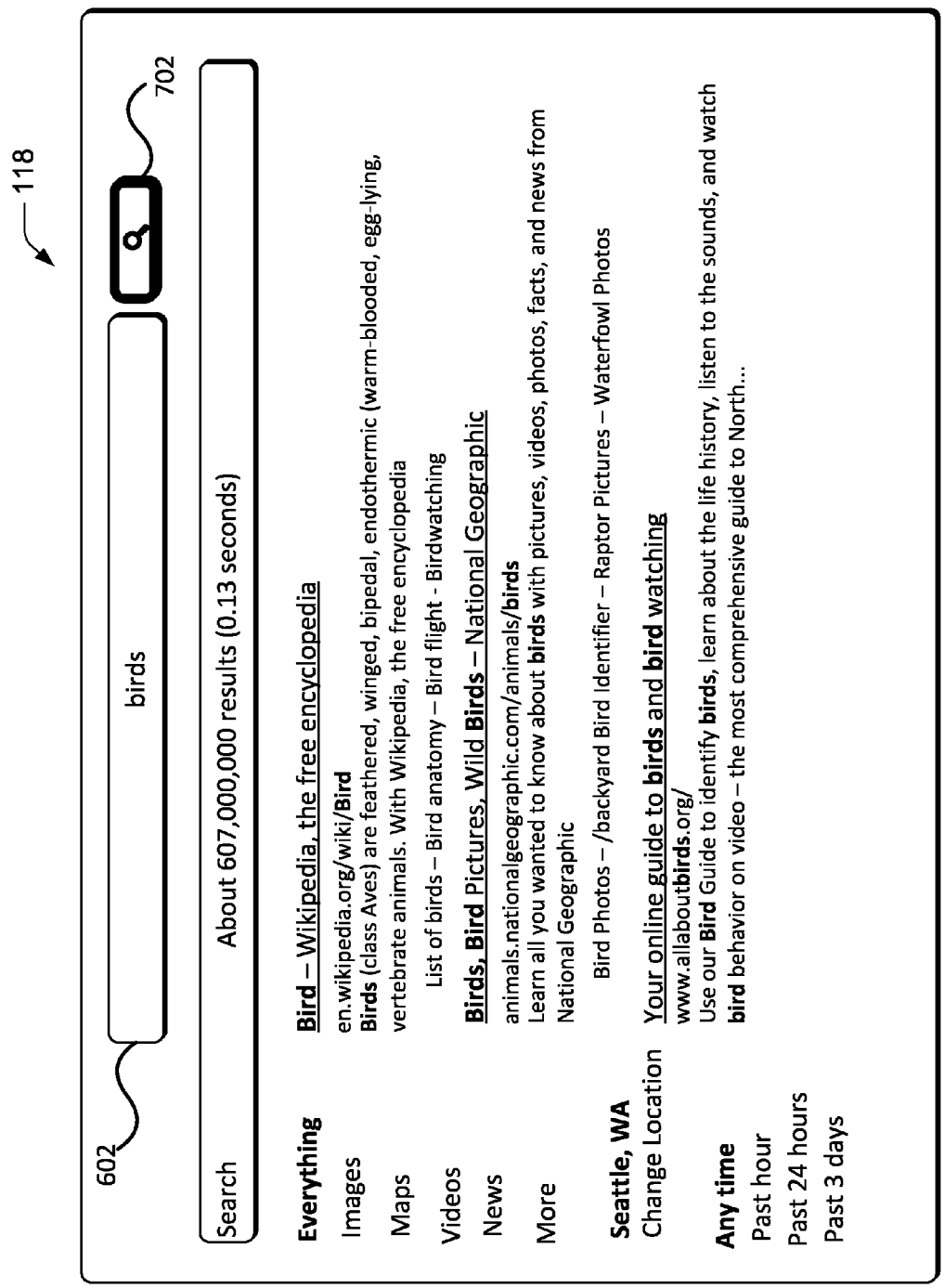

FIG. 7 illustrates an example of the webpage 118 according to one or more implementations described herein. In the illustrated webpage 118, the focus on the webpage 118 has moved to the search button 702. With one or more implementations described herein a user enters a keyboard shortcut, which causes the focus on the webpage 118 to move from the search text box 602 to the search button 702. For example, the user enters a keyboard shortcut selection of "<ctrl> <shift> >," where ">" represents the right arrow on the keyboard 106. In response to receiving the keyboard shortcut selection, the renderer 104 moves the focus on the webpage 118 over to the right to the search button 702.

Figure 8:
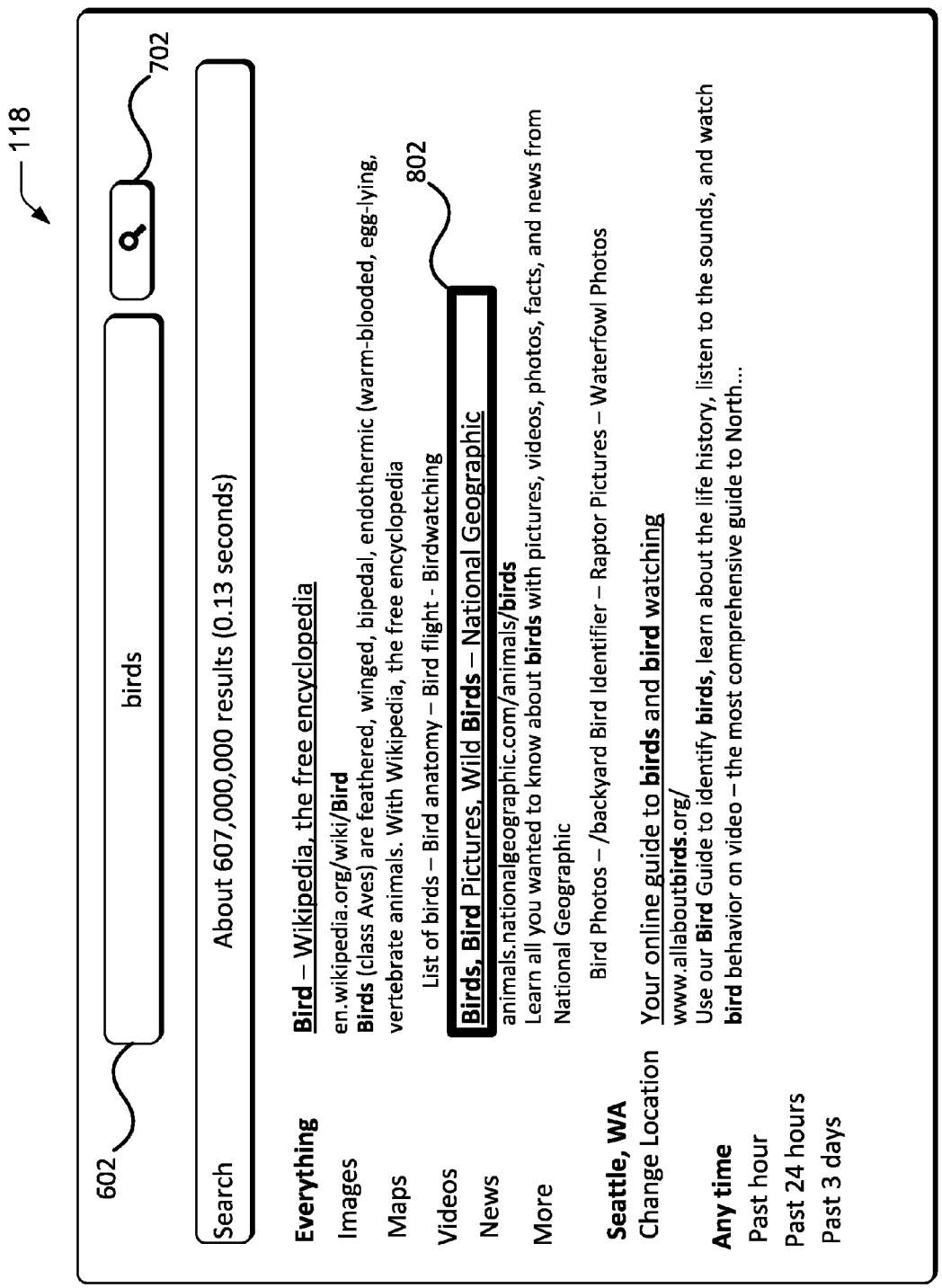

FIG. 8 illustrates an example of the webpage 118 according to one or more implementations described herein. In the illustrated webpage 118, the focus on the webpage 118 has moved to the search result 802. With one or more implementations described herein a user enters a keyboard shortcut, which causes the focus on the webpage 118 to move from the search button 702 to the search result 802. For the illustrated example, the user enters a keyboard shortcut selection of "<ctrl> <shift> v," twice, where "v" represents the down arrow on the keyboard 106. In response to receiving the keyboard shortcut selections, the renderer 104 moves the focus on the webpage 118 down to the search result 802.

Figure 9:
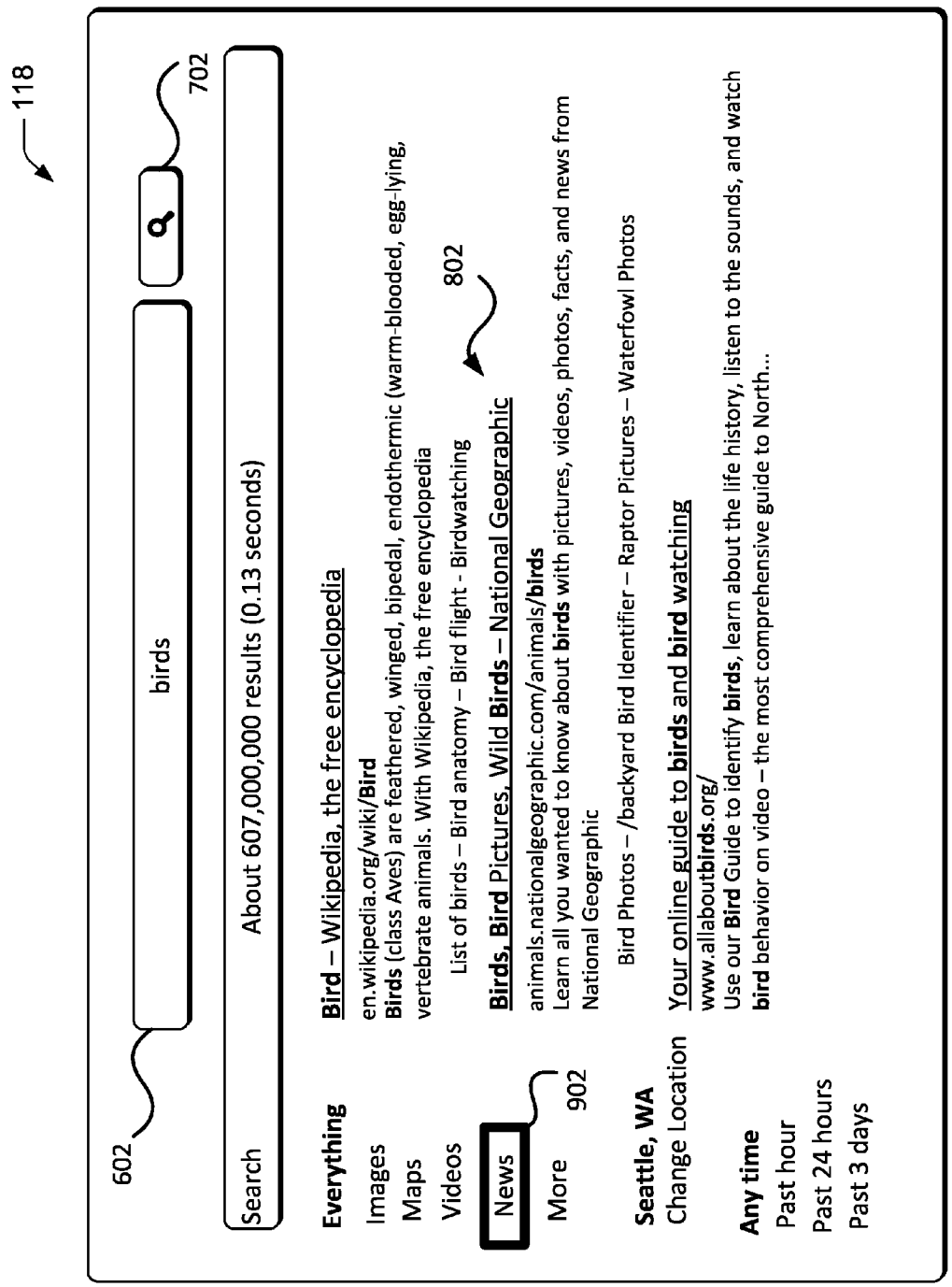

FIG. 9 illustrates an example of the webpage 118 according to one or more implementations described herein. In the illustrated webpage 118, the focus on the webpage 118 has moved to the "News" button 902. With one or more implementations described herein a user enters a keyboard shortcut, which causes the focus on the webpage 118 to move from the search result 802 to the "News" button 902. For example, the user enters a keyboard shortcut selection of "<ctrl> <shift> <," where "<" represents the left arrow on the keyboard 106. In response to receiving the keyboard shortcut selection, the renderer 104 moves the focus on the webpage 118 over to the left to the "News" button 902.

Figure 10:
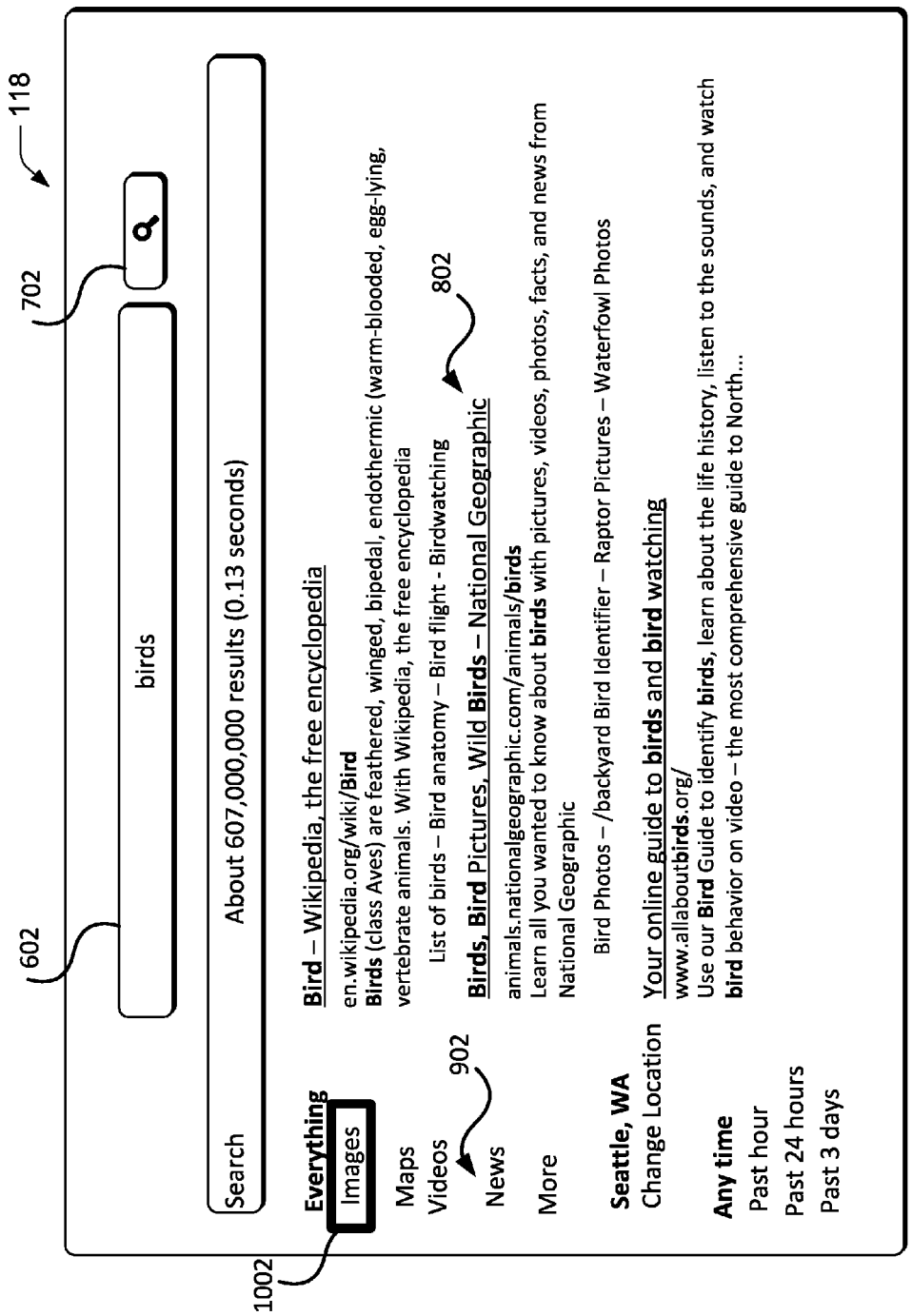

FIG. 10 illustrates an example of the webpage 118 according to one or more implementations described herein. In the illustrated webpage 118, the focus on the webpage 118 has moved to the "Images" button 1002. With one or more implementations described herein a user enters a keyboard shortcut, which causes the focus on the webpage 118 to move from the "News" button 902 to the "Images" button 1002. For the illustrated example, the user enters a keyboard shortcut selection of "<ctrl> <shift> ^," twice where "^" represents the up arrow on the keyboard 106. In response to receiving the keyboard shortcut selection, the renderer 104 moves the focus on the webpage 118 up to the "Images" button 1002.

Example Renderer-Assisted Webpage Navigating Tool Operation

Figure 11:
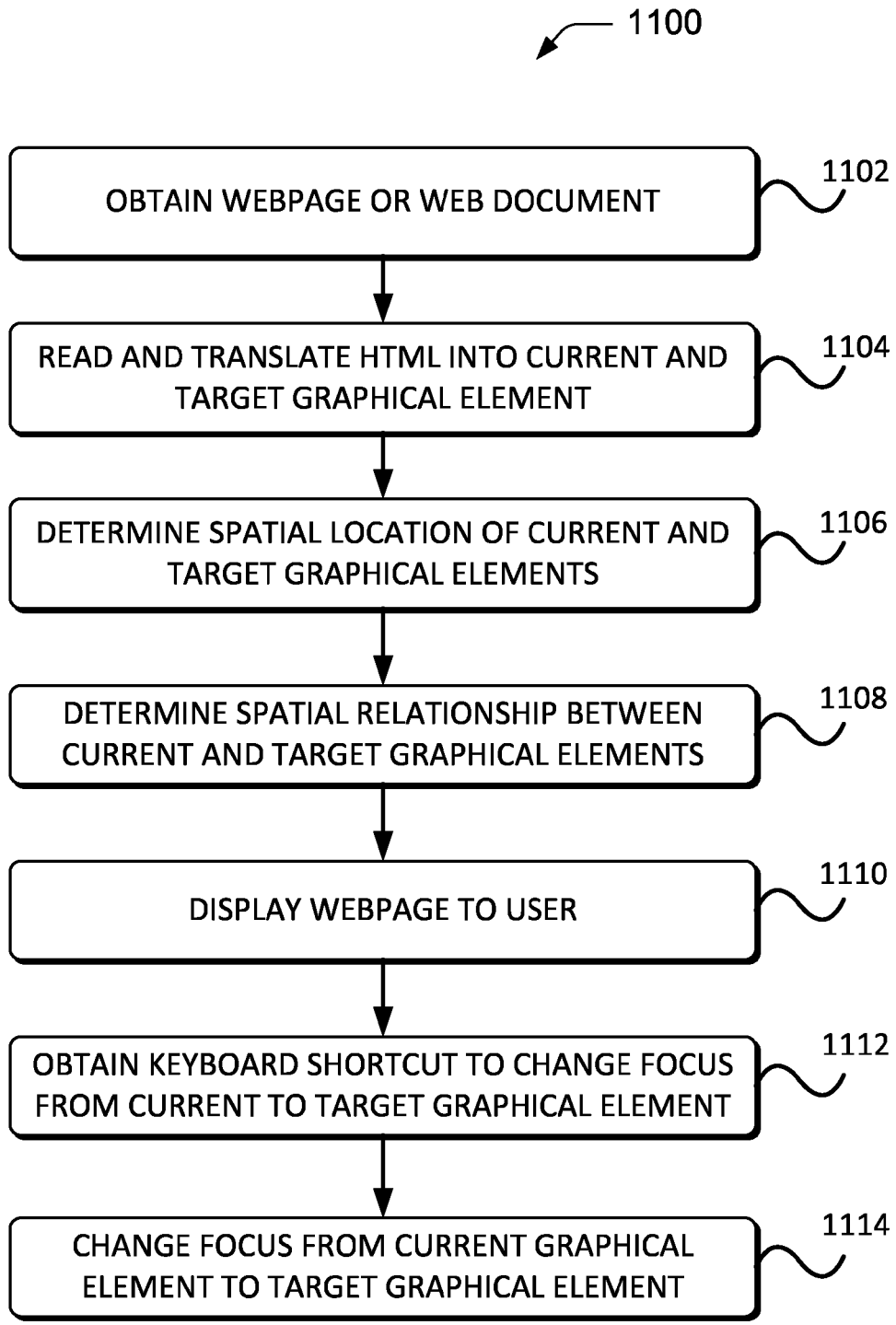
FIG. 11 is a flowchart of a method for navigating a webpage according to one or more implementations described herein.

FIG. 11 is a flowchart of a method 1100 illustrating operation of the webpage navigating tools 100 and/or 300 according to one or more implementations described herein.

In a block 1102, the method 1100 obtains a webpage or web document. With one or more implementations, the webpage 118 is retrieved by a user of the user interface 108 from a server that a Uniform Resource Locator (URL) for the webpage 118 indicates. The webpage 118 includes markup language elements, such as HTML elements.

In a block 1104, the method 1100 reads and translates markup language elements, such as hypertext markup language (HTML) elements, into graphical elements. With one or more implementations, the webpage layout module 110 reads the HTML elements. The webpage layout module 110 in the renderer 104 also translates the HTML elements into graphical representations of the HTML elements so that images, text, fonts, etc., are displayed on the webpage 118. The graphical elements include a currently focused graphical element and a target graphical element to which the user wants to change focus.

In a block 1106, the method 1100 determines the spatial locations of the currently focused graphical element and the target graphical element. With one or more implementations, the spatial location/relationship determiner 114 in the renderer 104 determines the spatial locations of the text entry box 602, the search button 702, the search result 802, the "News" button 902, and/or the "Images" button 1002, which are illustrated in FIG. 10.

In a block 1108, the method 1100 determines the spatial relationship between the currently focused graphical element and the target graphical element. With one or more implementations, the spatial location/relationship determiner 114 in the renderer 104 determines the spatial relationship among the text entry box 602, the search button 702, the search result 802, the "News" button 902, and/or the "Images" button 1002.

In a block 1110, the method 1100 displays a webpage to the user. With one or more implementations, the user interface 108 displays the webpage 118 to the user.

In a block 1112, the method 1100 obtains a keyboard shortcut selection from the user that indicates that the user wants to change focus from the currently focused graphical element to the target graphical element. With one or more implementations, the renderer 104 obtains a keyboard shortcut selection from the user via the keyboard 106. The keyboard shortcut selection indicates that the user wants to change focus from the text entry box 502, to the search button 702, to the search result 802, to the "News" button 902, or to the "Images" button 1002.

In a block 14, the method 1100 changes the focus on the webpage from the currently focused graphical element to the target graphical element With one or more implementations, in response to obtaining the keyboard shortcut the focus changing module 118 in the renderer 104 changes the focus on the webpage 118 from the text entry box 602, to the search button 702, to the search result 802, to the "News" button 902, or to the "Images" button 1002 in response to the keyboard shortcut.

Example Static Focus Changer Operation

Figure 12:
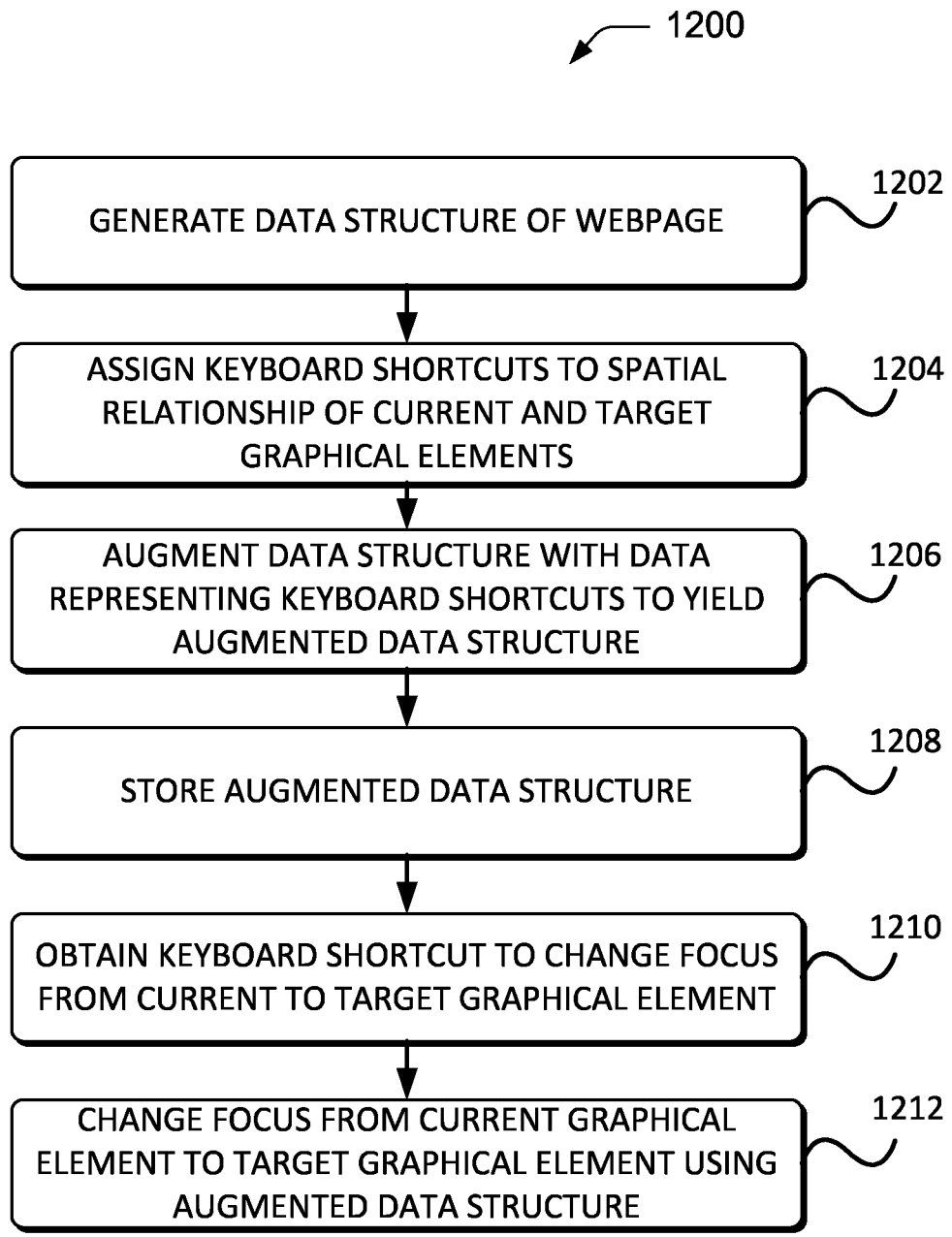
FIG. 12 is a flowchart of a method for changing focus on a webpage according to one or more alternative implementations described herein.

FIG. 12 is a flowchart of a method 1200 illustrating the operation of the static focus changer 116 in the webpage navigating tool 100 according to one or more alternative implementations described herein.

In a block 1202, the method 1200 generates a data structure for a webpage. With one or more implementations, the data structure module 302 in the static focus changer 116 generates a data structure for the webpage 118.

In a block 1204, the method 1200 assigns keyboard shortcuts to the spatial relationship among graphical elements on the webpage. With one or more implementations, keyboard shortcut assigner 304 in the static focus changer 116 assigns keyboard shortcuts to the spatial relationship among graphical elements on the webpage 118. For example, the keyboard shortcut assigner 304 assigns keyboard shortcuts to the spatial relationship among the text entry box 602, the search button 702, the search result 802, the "News" button 902, and/or the "Images" button 1002, which are illustrated in FIG. 10.

In a block 1206, the method 1200 augments the data structure with data representing the assigned keyboard shortcuts to yield an augmented data structure. With one or more implementations, the data structure augmenter 306 in the static focus changer 116 augments the data structure with data representing the assigned keyboard shortcuts.

In a block 1208, the method 1200 stores the augmented data structure. With one or more implementations the data structure storage module 308 in the static focus changer 116 stores the augmented data structure/DOM tree.

In a block 1210, the method 1200 obtains a keyboard shortcut that indicates that the user wants to change focus from the currently focused graphical element to the target graphical element. With one or more implementations, the renderer 104 obtains a keyboard shortcut selection from the user via the keyboard 106. The keyboard shortcut selection indicates that the user wants to change focus from the text entry box 602, to the search button 702, to the search result 802, to the "News" button 902, or to the "Images" button 1002.

In a block 122, the method 1200 changes the focus on the webpage from the currently focused graphical element to the target graphical element With one or more implementations, depending on the particular keyboard shortcut the static focus changer 116 in the renderer 104 changes the focus on the webpage 118 from the text entry box 602, to the search button 702, to the search result 802, to the "News" button 902, or to the "Images" button 1002.

Example Dynamic Focus Changer Operation

Figure 13:
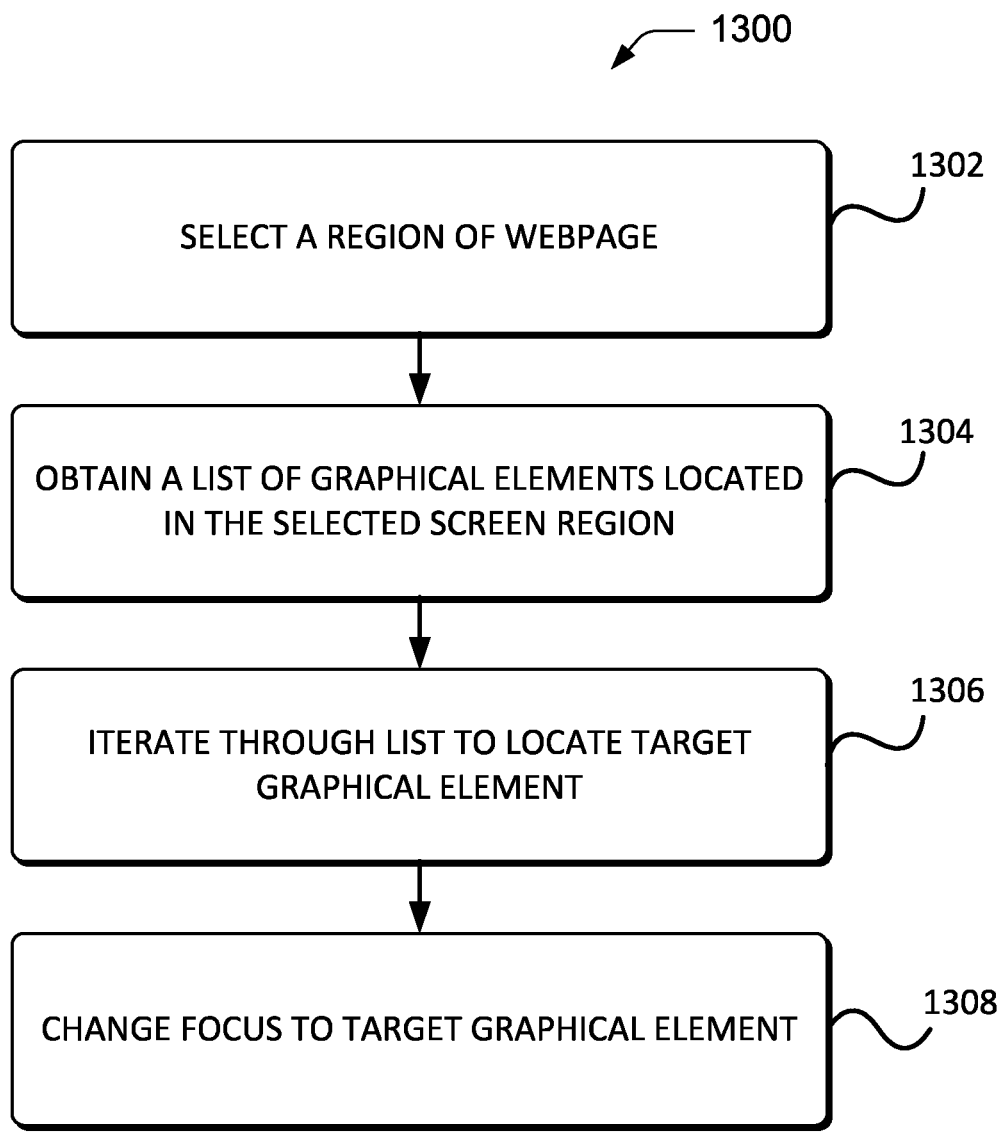
FIG. 13 is a flowchart of a method for changing focus on a webpage according to one or more alternative implementations described herein.

FIG. 13 is a flowchart of a method 1300 illustrating the operation of the focus changing module 118 in the webpage navigating tool 300 according to one or more implementations described herein.

In a block 1302, the method 1300 selects a region of a webpage. With one or more implementations, in response to a keyboard shortcut received that indicates that the user wants to change focus from a currently focused graphical element to a target graphical element, the region selector 402 in the dynamic focus changer 302 selects a region of the webpage 118 that includes the target graphical element.

In a block 1304, the method 1300 obtains a list of graphical elements located in the selected region of the webpage 118. With one or more implementations, the graphical element collector 406 in the dynamic focus changer 302 obtains a list of focusable and non-focusable elements that are located in the selected region of the webpage 118. For example, the graphical element collector 406 obtains a list that includes the text entry box 602, the search button 702, the search result 802, the "News" button 902, and the "Images" button 1002, which are illustrated in FIG. 10.

In a block 1306, the method 1300 filters the list of focusable and non-focusable elements, obtaining only the focusable elements. The method 1300 then iterates through the list of focusable elements to locate the target graphical element. With one or more implementations described herein, the graphical element filter/locator 408 in the dynamic focus changer 302 iterates through the list that includes the text entry box 602, the search button 702, the search result 802, the "News" button 902, and the "Images" button 1002 to locate the element that the keyboard shortcut represents.

In a block 1308, the method 1300 changes the focus on the webpage 118 from the currently focused element to the target graphical element. With one or more implementations, depending on the particular keyboard shortcut the focus changing module 118 in the renderer 104 changes the focus on the webpage 118 from the text entry box 602, to the search button 702, to the search result 802, to the "News" button 902, or to the "Images" button 1002.

The methods 1100, 1200, and 1300 are illustrated as a collection of actions in a logical flow graph, which represent a sequence of operations that can be implemented in mechanics alone or a combination with hardware, software, and/or firmware. In the context of software/firmware, the actions represent instructions stored on one or more computer-readable storage media that, when executed by one or more processors, perform the recited operations. Note that the order in which the processes are described is not intended to be construed as a limitation, and any number of the described process blocks can be combined in any order to implement the processes or an alternate process. Additionally, individual actions may be deleted from the processes without departing from the spirit and scope of the subject matter described herein.

Although examples herein have been described with reference to webpages, implementations are not so limited. For instance, the navigating tools 100 and/or 300 can be implemented for any web document and/or information resource, which is defined by the World Wide Web Consortium (W3C) as something that has a Uniform Resource Identifier (URI) and can return responses in a format such as hypertext markup language (HTML), Joint Photograph Experts Group (JPEG), and/or Resource Description Framework (RDF) of the identified resource in response to hypertext transfer protocol (HTTP) requests.

Example Computing Environment

Figure 14:
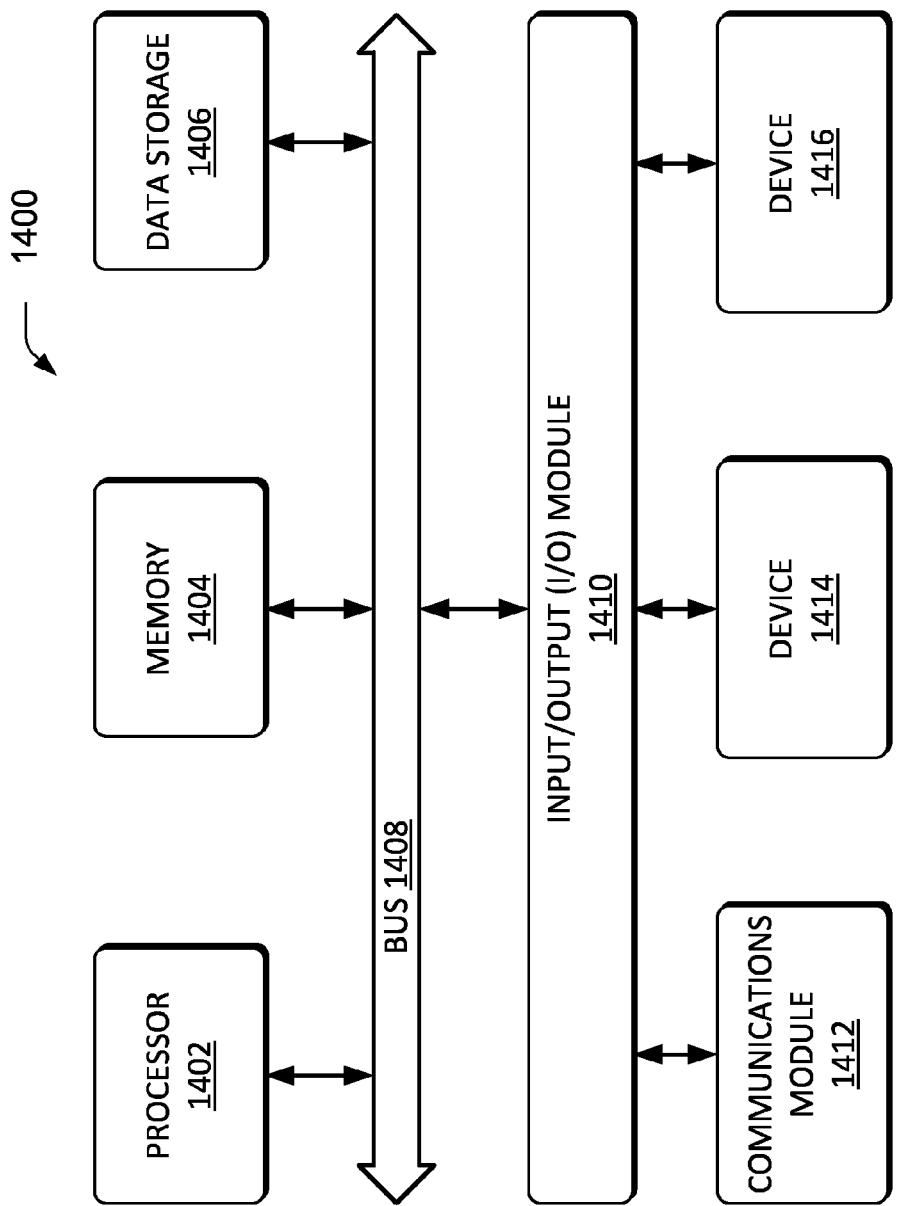
FIG. 14 is a high-level block diagram illustrating an example computer system suitable for implementing the technology described herein.

FIG. 14 is a high-level block diagram illustrating an example computer system 1400 suitable for implementing the renderer-assisted webpage navigating tool 100 of FIG. 1 and/or the renderer-assisted webpage navigating tool 300 of FIG. 3. In certain aspects, the computer system 1400 may be implemented using hardware or a combination of software and hardware.

The illustrated computer system 1400 includes a processor 1402, a memory 1404, and data storage 1406 coupled to a bus 1408 or other communication mechanism for communicating information. An input/output (I/O) module 1410 is also coupled to the bus 1408. A communications module 1412, a device 1414, and a device 1416 are coupled to the I/O module 1410.

The processor 1402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The processor 1402 may be used for processing information. The processor 1402 can be supplemented by, or incorporated in, special purpose logic circuitry.

The memory 1404 may be Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device used for storing information, a computer program, and/or instructions to be executed by the processor 1402. They memory 1404 may store code that creates an execution environment for one or more computer programs used to implement technology described herein.

A computer program as discussed herein does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

Unless indicated otherwise by the context, a module refers to a component that is hardware, firmware, and/or a combination thereof with software (e.g., a computer program.) A computer program as discussed herein does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The instructions may be implemented in one or more computer program products, i.e., one or more modules of computer program instructions encoded on one or more computer readable media for execution by, or to control the operation of, the computer system 1400, and according to any method well known to those of skill in the art. The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM))

The data storage 1406 may be a magnetic disk or optical disk, for example. The data storage 1406 may function to store information and instructions to be used by the processor 1402 and other components in the computer system 1400.

The bus 1408 may be any suitable mechanism that allows information to be exchanged between components coupled to the bus 1408. For example, the bus 1408 may be transmission media such as coaxial cables, copper wire, and fiber optics, optical signals, and the like.

The I/O module 1410 can be any input/output module. Example input/output modules 1410 include data ports such as Universal Serial Bus (USB) ports.

The communications module 1412 may include networking interface cards, such as Ethernet cards and modems.

The device 1414 may be an input device. Example devices 1414 include a keyboard, a pointing device, a mouse, or a trackball, by which a user can provide input to the computer system 1400.

The device 1416 may be an output device. Example devices 1416 include displays such as cathode ray tubes (CRT) or liquid crystal display (LCD) monitors that display information, such as webpages, for example, to the user.

One or more implementations are described herein with reference to illustrations for particular applications. It should be understood that the implementations are not intended to be limiting. Those skilled in the art with access to the teachings provided herein will recognize additional modifications, applications, and implementations within the scope thereof and additional fields in which the technology would be of significant utility. In the above description of example implementations, for purposes of explanation, specific numbers, materials, configurations, and other details are set forth in order to better explain implementations as claimed. However, it will be apparent to one skilled in the art that the claims may be practiced using details different than the examples described herein. In other instances, well-known features are omitted or simplified to clarify the description of the example implementations.

For example, it will be appreciated that several of the above-disclosed and other features and functions, or alternatives thereof, may be combined into many other different systems or applications. Also, it will be appreciated that various presently unforeseen or unanticipated alternatives, modifications, variations or improvements therein may be subsequently made by those skilled in the art, which are also intended to be encompassed by the claims that follow.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

In the claims appended herein, the inventor invokes 35 U.S.C. §112, paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. §112, paragraph 6.

What is claimed is:

1. A system for providing a webpage-navigating tool, the system comprising:
    a processor;
    a memory having instructions stored therein, which when executed by the processor, implement a renderer that includes:
        a webpage layout module configured to read markup language elements in a webpage, to translate the elements into graphical representations, and to arrange the graphical representations on a webpage, wherein the graphical representations include a current graphical element displayed on the webpage and a target graphical element displayed on the webpage;
        a spatial-location-relationship determiner configured to determine spatial locations on the webpage of the current and target graphical elements, and to determine a spatial relationship on the webpage between the current and target graphical elements; and
        a focus changer comprising:
            a data structure module configured to generate a data structure including the current and target graphical elements;
            a keyboard-shortcut assigner configured to assign a keyboard shortcut to the determined spatial relationship;
            a data-structure augmenter configured to augment the data structure with data representing the assigned-keyboard shortcut; and
            an augmented data structure module configured to store the augmented data structure,
            wherein the focus changer is configured to, in response to a selection of the keyboard shortcut, change focus on the webpage from the current graphical element to the target graphical element using the determined spatial locations, the determined spatial relationship and the stored augmented data structure; and
    a user interface configured to display the webpage with the changed focus.

2. A system according to claim 1, the focus changer further comprising:
    a region selector configured to select a webpage region;
    a graphical-element collector configured to obtain a list of graphical elements located in the selected webpage region, wherein the graphical elements located in the selected webpage region include the current graphical element and the target graphical element; and
    a graphical-element filter configured to iterate through the list of graphical elements to locate the target graphical element and to change focus on the screen from the current graphical element to the target graphical element upon locating the target graphical element.

3. A system according to claim 1, wherein the renderer is configured to use Cartesian coordinates of the webpage to determine the spatial location of the current and target graphical elements.

4. A system according to claim 1, wherein the renderer is configured to use Cartesian coordinates of the webpage to determine the spatial relationship of the current graphical element to the target graphical element.

5. A system according to claim 1, wherein the renderer is configured to use polar coordinates of the webpage to determine the spatial location of the current and target graphical elements.

6. A system according to claim 1, wherein the renderer is configured to use polar coordinates of the webpage to determine the spatial relationship of the current graphical element to the target graphical element.

7. A method comprising:
obtaining a webpage;
reading markup language elements in the webpage;
translating the markup language elements into graphical representations of the markup language elements, wherein the graphical representations include a current graphical element in the webpage and a target graphical element in the webpage;
determining spatial locations of the current and target graphical elements in the webpage;
determining a spatial relationship between the current and target graphical elements in the webpage;
displaying the webpage using the graphical representations;
generating a data structure having the markup language elements;
assigning a keyboard shortcut to the determined spatial relationship;
augmenting the generated data structure with data representing the assigned-keyboard shortcut;
storing the augmented data structure;
obtaining a selection of the keyboard-shortcut that indicates that a user wants to change focus of the webpage from the current graphical element to the target graphical element; and
in response to the keyboard-shortcut selection, changing the focus in the webpage from the current graphical element to the target graphical element using the determined spatial locations, the determined spatial relationship and the stored augmented data structure.

8. A method according to claim 7, wherein changing the focus on the webpage from the current graphical element to the target graphical element in response to the keyboard-shortcut selection further comprises:
selecting a region of the webpage;
obtaining a list of graphical elements located in the selected webpage region, wherein the graphical elements located in the selected webpage region include the current graphical element and the target graphical element; and
iterating through the list of graphical elements to locate the target graphical element and to change focus on the screen from the current graphical element to the target graphical element upon locating the target graphical element.

9. A method according to claim 7, wherein determining the spatial location of the current and target graphical elements includes using Cartesian coordinates of the webpage.

10. A method according to claim 7, wherein determining the spatial relationship between the current and target graphical elements includes using Cartesian coordinates of the webpage.

11. A method according to claim 7, wherein determining the spatial location of the current and target graphical elements includes using polar coordinates of the webpage.

12. A method according to claim 7, wherein determining the spatial relationship between the current and target graphical elements includes using polar coordinates of the webpage.

13. A method according to claim 7, wherein determining the spatial location of the current and target graphical elements includes using rectilinear coordinates of the webpage.

14. A method according to claim 7, wherein determining the spatial relationship between the current and target graphical elements includes using rectilinear coordinates of the webpage.

15. One or more non-transitory computer-readable media storing processor-executable instructions that when executed cause one or more processors to perform a method comprising:
obtaining a webpage having hypertext markup language (HTML) elements;
translating the HTML elements into graphical representations of the HTML elements, wherein the graphical representations include a current graphical element on the webpage and a target graphical element on the webpage;
determining spatial locations of the current and target graphical elements on the webpage; and
determining a spatial relationship between the current and target graphical elements on the webpage;
generating a data structure having the markup language elements;
assigning a keyboard shortcut to the determined spatial relationship;
augmenting the generated data structure with data representing the assigned-keyboard shortcut;
storing the augmented data structure;
obtaining a user selection of the keyboard-shortcut that indicates that the user wants to change focus on the webpage from the current graphical element to the target graphical element; and
using the determined spatial locations, the determined spatial relationship and the stored augmented data structure, changing the focus on the webpage from the current graphical element to the target graphical element in response to the keyboard-shortcut selection.

16. One or more non-transitory computer-readable media according to claim 15, wherein changing the focus on the webpage from the current graphical element to the target graphical element in response to the keyboard-shortcut selection includes:
selecting a screen region of the webpage;
obtaining a list of graphical elements that are located in the selected screen region, wherein the graphical elements located in the selected screen region include the current graphical element and the target graphical element;
filtering the graphical elements that are located in the selected screen region to locate the target graphical element; and
changing focus on the screen from the current graphical element to the target graphical element upon locating the target graphical element in the selected screen region.

17. One or more non-transitory computer-readable media according to claim 15, wherein determining the spatial location of the current and target graphical elements includes using Cartesian coordinates of the webpage.

18. One or more non-transitory computer-readable media according to claim 15, wherein determining the spatial relationship between the current and target graphical elements includes using Cartesian coordinates of the webpage.

19. One or more non-transitory computer-readable media according to claim 15, wherein determining the spatial location of the current and target graphical elements includes using polar coordinates of the webpage.

20. One or more non-transitory computer-readable media according to claim 15, wherein determining the spatial relationship between the current and target graphical elements includes using polar coordinates of the webpage.

* * * * *